United States Patent
Taniguchi et al.

(10) Patent No.: US 9,184,648 B2
(45) Date of Patent: Nov. 10, 2015

(54) ELECTRIC MOTOR WITH PERMANENT MAGNETS IN STATOR THEREOF

(75) Inventors: Makoto Taniguchi, Obu (JP); Kousuke Hanada, Okazaki (JP)

(73) Assignee: DENSO CORPORATION, Kariya (JP)

( * ) Notice: Subject to any disclaimer, the term of this patent is extended or adjusted under 35 U.S.C. 154(b) by 398 days.

(21) Appl. No.: 13/469,224

(22) Filed: May 11, 2012

(65) Prior Publication Data

US 2012/0286612 A1 Nov. 15, 2012

(30) Foreign Application Priority Data

May 11, 2011 (JP) ................................ 2011-105856
Oct. 21, 2011 (JP) ................................ 2011-231923

(51) Int. Cl.
*H02K 1/16* (2006.01)
*H02K 1/27* (2006.01)
*H02K 29/03* (2006.01)
*H02K 21/16* (2006.01)

(52) U.S. Cl.
CPC .................. *H02K 29/03* (2013.01); *H02K 1/16* (2013.01); *H02K 1/2766* (2013.01); *H02K 21/16* (2013.01)

(58) Field of Classification Search
CPC ........ H02K 1/16; H02K 1/276; H02K 1/2766
USPC ............................ 310/156.45, 156.47, 156.53
See application file for complete search history.

(56) References Cited

U.S. PATENT DOCUMENTS

| 4,847,526 | A | * | 7/1989 | Takehara et al. .............. 310/185 |
| 5,990,592 | A | * | 11/1999 | Miura et al. .............. 310/156.53 |
| 6,847,144 | B1 | * | 1/2005 | Luo .......................... 310/156.49 |
| 7,425,786 | B2 | * | 9/2008 | Hino et al. ................ 310/156.57 |
| 2004/0004408 | A1 | | 1/2004 | Yamazaki et al. |
| 2005/0200223 | A1 | | 9/2005 | Tajima et al. |
| 2006/0028082 | A1 | * | 2/2006 | Asagara et al. .......... 310/156.53 |
| 2006/0145561 | A1 | * | 7/2006 | Sakuma et al. ............... 310/216 |

(Continued)

FOREIGN PATENT DOCUMENTS

| CN | 1471217 | 1/2004 |
| JP | 2002-305859 | 10/2002 |

(Continued)

OTHER PUBLICATIONS

Office Action (8 pgs.) dated Feb. 19, 2014 issued in corresponding Chinese Application No. 201210147568.7 with an at least partial English-language translation thereof (14 pgs.).

(Continued)

*Primary Examiner* — Quyen Leung
*Assistant Examiner* — Eric Johnson
(74) *Attorney, Agent, or Firm* — Nixon & Vanderhye P.C.

(57) ABSTRACT

In an electric motor, each tooth of the stator has a radially extending pillar portion and the number of teeth per magnetic pole is k. When the number k is odd and a center line passing each pole agrees with a center of a circumferential width of one tooth, the pole has first and second corners which are the closest to the stator and positioned before and after the center line in a rotational direction, respectively, and the teeth includes teeth which are the closest to the first and second corners and defined as first and second teeth, respectively. The first and second corners are located according to positional relationships of the first and second teeth and edges of the pillar portions of the first and second teeth in the rotation direction.

5 Claims, 11 Drawing Sheets

(56) References Cited

U.S. PATENT DOCUMENTS

| | | |
|---|---|---|
| 2007/0085436 A1 | 4/2007 | Tajima et al. |
| 2009/0179518 A1 | 7/2009 | Tajima et al. |
| 2009/0224623 A1* | 9/2009 | Saito et al. ............... 310/156.53 |
| 2009/0224627 A1* | 9/2009 | Hino et al. ............. 310/216.077 |
| 2010/0117465 A1* | 5/2010 | Kamiya et al. .................. 310/51 |
| 2010/0117475 A1* | 5/2010 | Leonardi et al. ......... 310/156.47 |
| 2010/0181864 A1* | 7/2010 | Miura et al. ........... 310/216.094 |
| 2012/0038236 A1 | 2/2012 | Tajima et al. |
| 2012/0274160 A1 | 11/2012 | Hino et al. |

FOREIGN PATENT DOCUMENTS

| | | |
|---|---|---|
| JP | 2004-40897 | 2/2004 |
| JP | 2005-261024 | 9/2005 |
| JP | 2006-025572 | 1/2006 |
| JP | 2006-050739 | 2/2006 |
| JP | 2008-301610 | 12/2008 |
| JP | 2009-213256 | 9/2009 |
| JP | 2011-050216 | 3/2011 |

OTHER PUBLICATIONS

Office Action (3 pgs.) dated Feb. 4, 2014 issued in corresponding Japanese Application No. 2011-231923 with an at least partial English-language translation thereof (4 pgs.).

Office Action (3 pgs.) dated Jun. 4, 2013 issued in corresponding Japanese Application No. 2011-231923 with an at least partial English-language translation thereof (6 pgs.).

Office Action and Search Report issued in corresponding Chinese Application No. 201210147568.7 dated Dec. 24, 2014 (with translation).

* cited by examiner

FORWARD ← REARWARD
ROTATIONAL DIRECTION

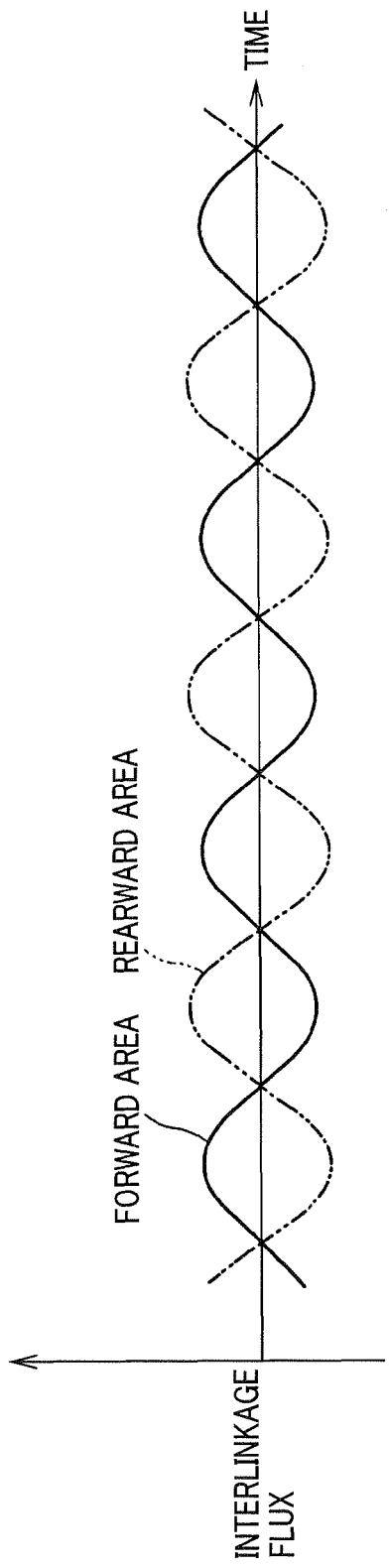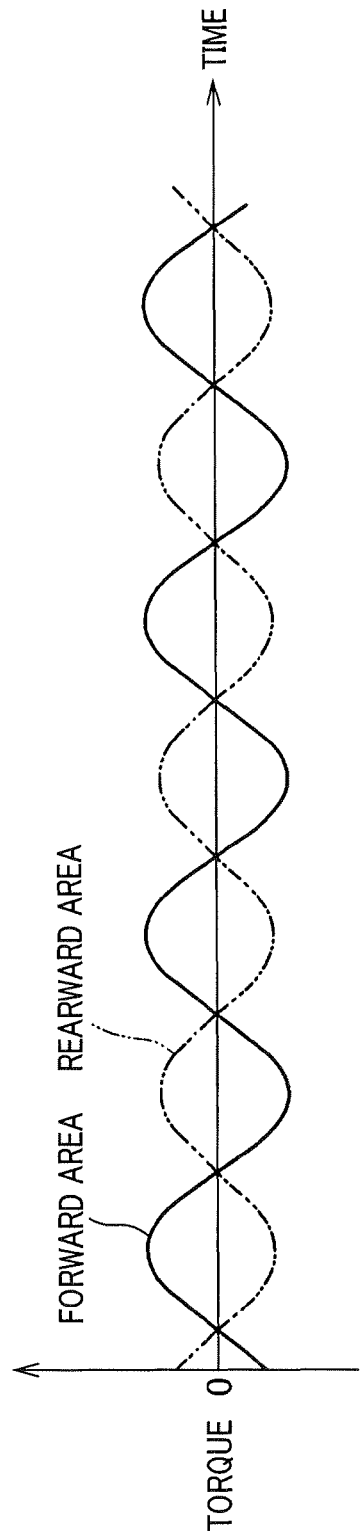

FORWARD ← → REARWARD
ROTATIONAL DIRECTION

FORWARD ← → REARWARD
ROTATIONAL DIRECTION

ELECTRIC MOTOR WITH PERMANENT MAGNETS IN STATOR THEREOF

CROSS-REFERENCE TO RELATED APPLICATION

This application is based on and claims the benefit of priorities from earlier Japanese Patent Application Nos. 2011-105856 and 2011-231923 filed May 11, 2011 and Oct. 21, 2011, respectively, the descriptions of which are incorporated herein by reference.

BACKGROUND OF THE INVENTION

1. Technical Field of the Invention

The present invention relates to an electric motor suitable for various types of brushless motors for use in industries, home appliances and vehicles, and in particular, to an electric motor suitable for driving compressors for vehicles and suitable for use as servomotors for vehicles.

2. Related Art

Recently, electric motors using permanent magnets as magnetic poles tend to suffer from cogging torque due to the enhancement of magnetic performances.

In this regard, a technique of contriving the shape of magnetic poles is put into practice to reduce cogging torque. However, such a technique raises problems of involving a high-precision press technique and producing a lot of scraps.

A patent document JP-A-2011-050216 discloses a technique of reducing cogging torque and torque ripple by using a specific arrangement of the magnetic poles of a rotor with respect to the teeth of a stator. According to this technique, one magnetic pole is composed of two permanent magnets arranged in a V-shape. The two permanent magnets forming one magnetic pole are arranged in a range which is defined by the center lines of the respective second teeth leftward and rightward of the tooth confronting the center of the magnetic pole.

However, the technique disclosed in JP-A-2011-050216 has a main purpose of reducing torque ripple and thus exerts only a low effect of reducing cogging torque. Further, the technique is only applicable to a type of motors in which one magnetic pole is composed of two permanent magnets (V-shaped arrangement).

SUMMARY

In light of the conditions as set forth, it is desired to minimize cogging torque not only in electric motors having permanent magnets arranged in a V-shape but also in any electric motors using permanent magnets as magnetic poles.

In order to achieve the above object, as an exemplary embodiment, there is provided an electric motor, comprising: a rotor having magnetic poles composed of permanent magnets; and a stator comprising a stator core arranged with an air gap between the rotor and stator, the stator being formed to have a radial direction and a circumferential direction, the stator core having a back yoke, teeth extended radially from the back yoke and arrayed at equal pitches in the circumferential direction, and slots each formed between two of the teeth and arrayed at equal pitches in the circumferential direction, the stator windings being wound through the slots. Each of the teeth comprises a radially extending pillar portion, the number of the teeth per magnetic pole, k, is set to k=m·n−(n−j), where m denotes the number of phases of the stator windings, n denotes the number of teeth per pole and per phase, n being a positive number, j denotes a number which is 0≤j<n.

When the number k is odd and a center line passing each of the poles agrees with a center of a circumferential width of one of the teeth in the circumferential direction, the pole has a first corner which is the closest to the stator and positioned before the center line in a rotational direction of the rotor, the teeth includes a tooth which is the closest to the first corner and which is defined as a first tooth, the pole has a second corner which is the closest to the stator and positioned after the center line in the rotational direction, the teeth include a tooth which is the closest to the second corner and which is defined as a second tooth. The first corner is set to be located between a center line passing through a center of a circumferential width of the first tooth and a first line passing through a front edge of the pillar portion of the first teeth in the rotation direction. The second corner is set to be located between a center line passing through a center of a circumferential width of the second tooth and a second line passing through a rear edge of the pillar portion of the second teeth in the rotation direction.

Thus, when the rotor is rotated in a state where no power is supplied to the stator winding, interlinkage flux is increased in the rotationally forward area with the rotation of the rotor, while interlinkage flux is decreased in the rotationally rearward area with the rotation of the rotor. In other words, when the rotor is rotated by an external force at a constant velocity in a state where no power is supplied, phases are offset between the rotationally forward and rearward areas in the temporal changes of torque. Accordingly, when the torque generated in the rotationally forward area is maximized, the torque generated in the rotationally rearward area is minimized. Thus, combined torque, i.e. the torque generated in the rotationally forward area combined with the torque generated in the rotationally rearward area, is reduced to thereby reduce cogging torque.

According to another exemplary embodiment, the number of teeth k is an even number. Further, the first corner is ensured to be positioned between the center line passing through the center of the first tooth with respect to the width direction and the end line extended from the rotationally-forward longitudinal edge of the pillar portion of the first tooth. Also, the second corner is ensured to be positioned between the center line passing through the center of the second tooth with respect to the width direction and the end line extended from the rotationally-rearward longitudinal edge of the pillar portion of the second tooth. This positioning of the corners is established when the positional relationship between the rotor and the stator is such that the center line of the magnetic pole coincides with the center of a space between predetermined teeth with respect to the width direction.

According to the second aspect as well, the advantages similar to those of the first aspect are obtained.

According to another exemplary embodiment of the electric motor, the rotor is configured by coaxially stacking two rotor blocks in the axial direction, the two rotor blocks having respective magnetic poles. The two rotor blocks are stacked such that that the magnetic poles of one rotor block are positionally offset in the circumferential direction from those of the other rotor block. In other words, a stepped skew is applied to the rotor.

Further, the first and second corners of each magnetic pole of one of the rotor blocks satisfy the positioning conditions similar to those of each magnetic pole of the rotor according to the first aspect.

Thus, a rotor having such a stepped skew also achieves the advantages similar to those of the rotor according to the first aspect.

According to another exemplary embodiment of the electric motor, the rotor is configured by coaxially stacking two rotor blocks in the axial direction, the two rotor blocks having respective magnetic poles. The two rotor blocks are stacked such that that the magnetic poles of one rotor block are positionally offset in the circumferential direction from those of the other rotor block. In other words, a stepped skew is applied to the rotor.

Further, the first and second corners of each magnetic pole of one of the rotor blocks satisfy the positioning conditions similar to those of each magnetic pole of the rotor according to the second aspect.

Thus, a rotor having such a stepped skew also achieves the advantages similar to those of the rotor according to the second aspect.

As another exemplary embodiment of the electric motor, each of the poles has two permanent magnets, one of the permanent magnets being defined as a first magnet and being positioned before the center line, the other of the permanent magnets being defined as a second magnet and being positioned after the center line, the first corner is provided as a corner of the first magnet, which corner is the closest to the stator before the center line, and the second corner is provided as a corner of the second magnet, which corner is the closest to the stator after the center line. Further, as another exemplary embodiment of the electric motor, the first magnet has a third corner located to be opposed to the first corner in a vertical direction to a magnetization direction of the first magnet and located in the rearward circumferential range, the second magnet has a forth corner located to be opposed to the second corner in a vertical direction to a magnetization direction of the second magnet and located in the forward circumferential range, and the third and fourth corners are opposed, in the radial direction, to non-magnetic portions produced in two of the slots, which two slots are located, in the circumferential direction, before and after the tooth through which the center line passes.

Thus, when one magnetic pole is composed of two permanent magnets, harmonic components are reduced from combined torque, i.e. the torque generated in the rotationally forward area combined with the torque generated in the rotationally rearward area. In particular, when a stepped skew is applied to the rotor, harmonic components are more effectively reduced from the combined torque of the two rotor blocks.

As another exemplary embodiment of the electric motor, each of the poles has two permanent magnets, one of the permanent magnets being defined as a first magnet and being positioned in the forward circumferential range, the other of the permanent magnets being defined as a second magnet and being positioned in the rearward circumferential range, the first corner is provided as a corner of the first magnet, which corner is the closest to the stator in the forward circumferential range, and the second corner is provided as a corner of the second magnet, which corner is the closest to the stator in the rearward circumferential range. Similarly, as another exemplary embodiment of the electric motor, the first magnet has a third corner located to be opposed to the first corner in a vertical direction to a magnetization direction of the first magnet and located in the rearward circumferential range, the second magnet has a forth corner located to be opposed to the second corner in a vertical direction to a magnetization direction of the second magnet and located in the forward circumferential range, and the third and fourth corners are opposed, in the radial direction, to two of the teeth, which two teeth are located, in the circumferential direction, before and after the slot through which the center line passes.

Thus, similarly to the foregoing, when one magnetic pole is composed of two permanent magnets, harmonic components are reduced from combined torque, i.e. the torque generated in the rotationally forward area combined with the torque generated in the rotationally rearward area. In particular, when a stepped skew is applied to the rotor, harmonic components are more effectively reduced from the combined torque of the two rotor blocks.

As another exemplary embodiment of the electric motor, each of the teeth has a flange portion formed atop the pillar portion, and the two pillar portions mutually adjacent to each other are separated, in the circumferential direction, by a distance larger than an amount of the air gap formed between the stator and the rotor. Thus, three effects exerted by the electric motor are balanced, the three effects being enhancement of the output of the electric motor, easiness of winding the stator winding about the stator core, and reduction of cogging torque.

As another exemplary embodiment of the electric motor, the stator windings are full-pitch windings. Thus, torque ripple caused when power is supplied to the stator winding is reduced.

BRIEF DESCRIPTION OF THE DRAWINGS

In the accompanying drawings:

FIG. 3A is a waveform diagram illustrating temporal changes of interlinkage flux generated in the electric motor;

FIG. 3B is a waveform diagram illustrating temporal changes of torque when no electric power is supplied to the stator winding;

DETAILED DESCRIPTION OF THE PREFERRED EMBODIMENTS

Figure 1:
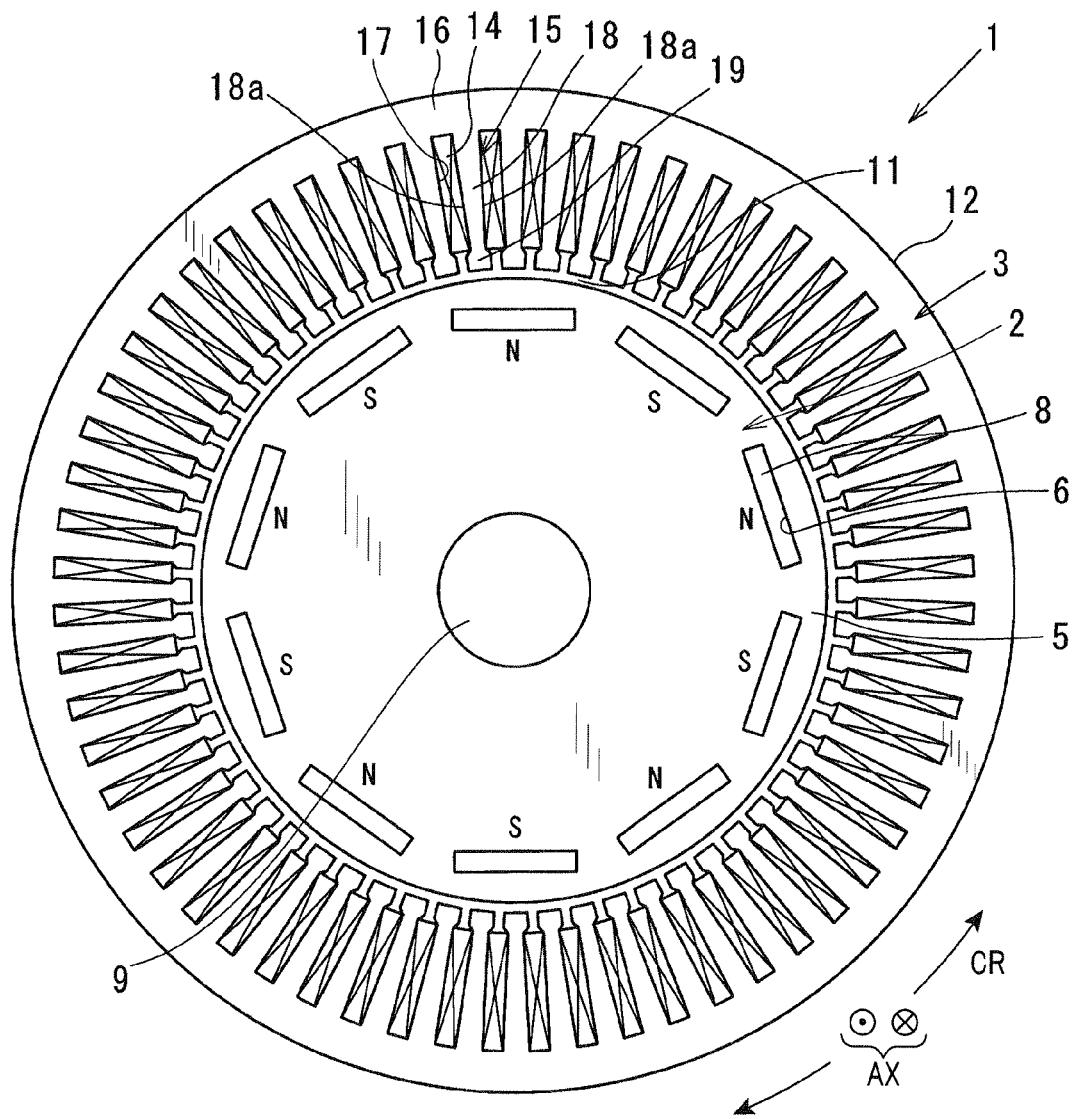
FIG. 1 is a diagram illustrating a configuration of an electric motor according to a first embodiment of the present invention.

With reference to the accompanying drawings, hereinafter are described several embodiments of the present invention.

First Embodiment

Referring to FIGS. 1, 2A and 2B, and 3A and 3B, an electric motor 1 according to a first embodiment of the present invention is described.

The electric motor 1 is a three-phase AC motor including a rotatably supported rotor 2 and a stator 3. The stator 3 is arranged along the outer periphery of the rotor 2 so as to surround the rotor 2.

The rotor 2 is of a permanent magnet type and includes a rotor core 5 and permanent magnets 8. The rotor core 5 is made of stacked electromagnetic plates which are formed into a cylindrical shape. The permanent magnets 8 are fit into respective magnet insertion holes 6 formed in the rotor core 5 to form magnetic poles. The rotor core 5 has a center at which a shaft 9 is fixed to serve as a rotary shaft.

In the present embodiment, one pole is composed of one permanent magnet 8. The permanent magnets 8 having N-poles directed outward are circumferentially alternated with the permanent magnets 8 having S-poles directed outward, with an even interval therebetween. In the present embodiment, the number of poles p is ten (p=10).

Each permanent magnet 8 is a plate having a rectangular axial cross section. As viewed from the axial direction AX of the rotor 2, the direction of the shorter dimension of the magnet 8 corresponds to the magnetization direction. In other words, the permanent magnets 8 are arranged so that the magnetization direction is provided along the radial direction RA (refer to FIG. 2A).

The stator 3 includes a stator core 12 and a stator winding 14. The stator core 12 is arranged opposed to the rotor 2 with the intervention of an air gap 11 therebetween. The stator winding 14 is wound about the stator core 12. When three-phase AC current is passed through the stator winding 14, a rotating field is formed and the rotor 2 arranged in the rotating field is rotated.

The stator 3 is formed by winding the stator winding 14 which is made up of a three-phase coil, about the stator core 12 which is formed of cylindrically-shaped stacked electromagnetic steel plates. Full-pitch distributed winding method is applied in winding the stator winding 14 about the stator core 12.

The stator core 12 includes a plurality of teeth 15 and a back yoke portion 16. The plurality of teeth 15 have respective ends confronting the rotor 2. The back yoke portion 16 magnetically connects the teeth 15 with each other to form the outer periphery of the electric motor 1.

Each space defined by two teeth 15 adjacent to each other and the back yoke portion 16 serves as a slot 17 in which the stator winding 14 is placed when wound about the stator core 12.

In the present embodiment, sixty teeth 15 are arranged along the circumference being evenly spaced apart. Specifically, the total number of teeth is sixty, the number of winding phases m is three and the number of magnetic poles p is ten. Accordingly, the number of teeth n per one pole and per one phase is two.

Each tooth 15 includes a pillar portion 18 and a flange portion 19. The pillar portion 18 is wound with the stator winding 14. The flange portion 19 is provided at an end of the pillar portion 18 so as to confront the rotor 2. The flange portion 19 is extended from its lateral sides in the rotational direction, i.e., the circumferential direction CR of the motor (refer to FIG. 1). The pillar portion 18 extends inward from the back yoke portion 16 and has tapered surfaces 18a on both sides thereof with respect to its width direction. In other words, the pillar portion 18 is formed so as to have a smaller width (in the rotational direction) as it extends inward. The extended end portion of the pillar portion 18 has a larger width to form the flange portion 19.

In the present embodiment, the number of teeth k confronting one magnetic pole, i.e., per magnetic pole, is expressed by:

$$k = m \times n - (n - j) \quad (1)$$

where j is a number which is an integer equal to or larger than zero and less than n (0≤j<n).

As mentioned above, in the present embodiment, the number of phases m of the stator winding 14 is three, and the number of teeth n per one pole and per one phase is two. Further, in the present embodiment, the rotor 2 and the stator 3 are provided by setting the integer j to 1, so that the number of teeth k confronting one pole will be five. Thus, the number of teeth k confronting one pole is an odd number.

Figure 2A:
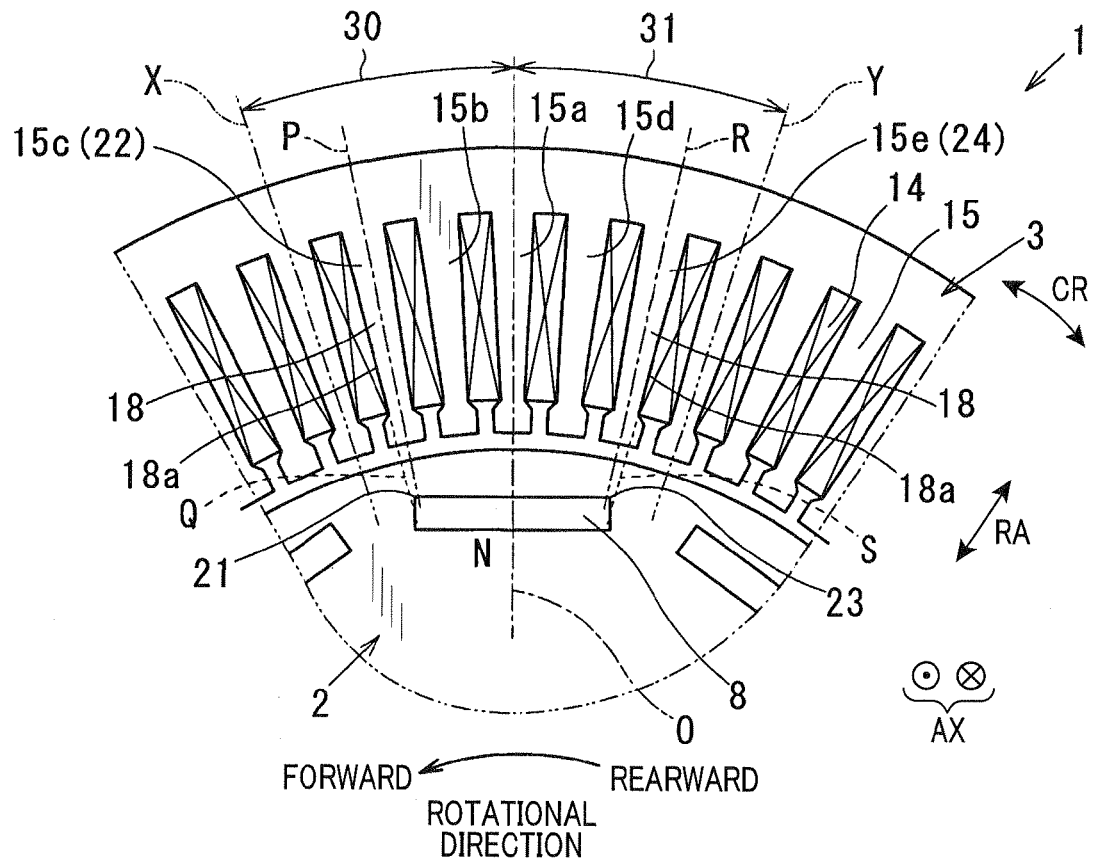
FIG. 2A is a partially enlarged view of the electric motor.
Figure 2B:
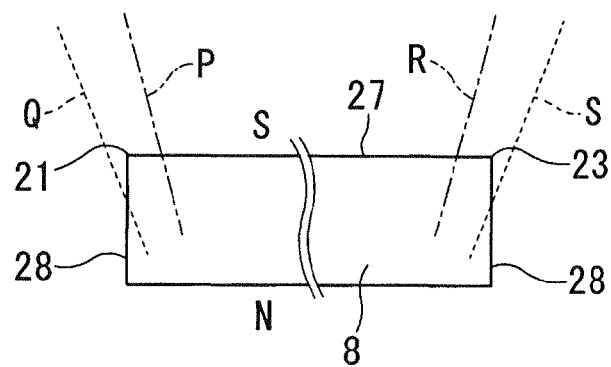
FIG. 2B is a partially enlarged view of the electric motor illustrated in FIG. 2A.

Referring to FIGS. 2A and 2B, hereinafter is described how the permanent magnets 8 are arranged. FIG. 2A is a partially enlarged view of the electric motor 1 and FIG. 2B is a partially enlarged view of the electric motor 1 illustrated in FIG. 2A. As shown in FIG. 2A, the five teeth 15 confronting each permanent magnet 8 are referred to as a tooth 15a, tooth 15b, tooth 15c, tooth 15d and tooth 15e. The arrangement of the permanent magnets 8 according to the present embodiment is established when the positional relationship between the rotor 2 and the stator 3 is such that a center line 0 of each permanent magnet 8 coincides with the center of the tooth 15a with respect to the width direction.

In the present embodiment, the center line 0 of a magnetic pole is a line connecting the center of each permanent magnet 8 with respect to its longitudinal direction (which is perpendicular to the magnetization direction) and the rotational center of the rotor 2.

As shown in FIG. 2A, the permanent magnet 8 forming a magnetic pole confronts the front face of the tooth 15a. In the permanent magnet 8, the corner rotationally frontward of the center line 0 and nearest to the stator 3 is referred to as a first corner 21, and the corner rotationally rearward of the center line 0 and nearest to the stator 3 is referred to as a second corner 23. The tooth 15 nearest to the first corner 21 is referred to as a first tooth 22 and the tooth 15 nearest to the second corner 23 is referred to as a second tooth 24.

In the present embodiment, the tooth 15a is at the center of the five teeth 15. Further, the tooth 15b is the first tooth rotationally forward of the center line 0. The tooth 15c is the second tooth rotationally forward of the center line 0. The tooth 15d is the first tooth rotationally rearward of the center line 0. The tooth 15e is the second tooth rotationally rearward of the center line 0. Thus, the tooth 15c corresponds to the first tooth 22 located nearest to the first corner 21. Also, the tooth 15e corresponds to the second tooth 24 located nearest to the second corner 23.

In the present embodiment, the following positioning of the corners is established when the positional relationship between the rotor 2 and the stator 3 is such that, as shown in FIG. 2A, the center line 0 of the pole coincides with the center of the tooth 15a with respect to the width direction. Specifically, in the positioning, as shown in FIG. 2B, the first corner 21 of the permanent magnet 8 is ensured to be positioned between a center line P and an end line Q (which is referred to as a first line), which are defined virtually in the space. Also, as shown in FIG. 2B, the second corner 23 of the permanent magnet 8 is ensured to be positioned between a center line R and an end line S (which is referred to as a second line), which are defined virtually in the space.

In this case, the center line P is a line passing through the center of the first tooth 22 with respect to the width direction, i.e. a line connecting between the center of the first tooth 22 and the rotational center of the rotor 2. The end line Q is a line extended along the rotationally-forward tapered surface 18a of the pillar portion 18 of the first tooth 22. The center line R is a line passing through the center of the second tooth 24 with respect to the width direction, i.e. a line connecting between the center of the second tooth 24 and the rotational center of the rotor 2. The end line S is a line extended along the rotationally-rearward tapered surface 18a of the pillar portion 18 of the second tooth 24.

As shown in FIG. 2B, each permanent magnet 8 has a side surface 27 on a stator side with respect to the magnetization direction, and has lateral side surfaces 28 extending in the magnetization direction. In the present embodiment, the center lines P and R intersect the side surface 27, while the end lines Q and S intersect the respective side surfaces 28.

Taking an example, hereinafter are described changes of interlinkage flux and changes of torque accompanying the changes of interlinkage flux. In the example, the rotor 2 is rotated counterclockwise (in the rotationally forward direction) by an external force at a constant angular velocity, from a state where the positional relationship shown in FIG. 2A is established with no power being supplied to the stator winding 14.

With respect to the center line 0, the area in the rotationally forward direction is referred to as a forward area 30 and the area in the rotationally rearward direction is referred to as a rearward area 31. Specifically, the forward area 30 covers an angular range from the center line 0 to a center line X of the tooth 15 which is adjacent to the first tooth 22 located rotationally forward thereof. The rearward area 31 covers an angular range from the center line 0 to a center line Y of the tooth 15 which is adjacent to the second tooth located rotationally rearward thereof.

FIG. 3A is a waveform diagram illustrating temporal changes of interlinkage flux generated in the electric motor 1. FIG. 3B is a waveform diagram illustrating temporal changes of torque when no electric power is supplied to the stator winding 14.

The solid-line waveform of FIG. 3A indicates temporal changes of interlinkage flux generated in the forward area 30. In the state shown in FIG. 2A, the teeth 15a and 15b in the forward area 30 completely confront the permanent magnet 8. A slight counterclockwise (rotationally forward) rotation of the rotor 2 in this state will not change the flux content circling the stator core 12. On the other hand, the tooth 15c only partially confronts the permanent magnet 8. The flux content in this state corresponds to substantially half of a minimum flux content or a maximum flux content. The flux content is maximized when the rotor 2 is rotated to a position where the tooth 15c completely confronts the permanent magnet 8.

Therefore, in the forward area 30, a slight counterclockwise rotation of the rotor 2 from the state shown in FIG. 2A increases an area where the tooth 15c confronts the permanent magnet 8. Accordingly, the interlinkage flux circling the stator core 12 is increased. Thus, the temporal changes of the interlinkage flux generated in the forward area 30 result in a waveform as indicated by the solid line in FIG. 3A.

The magnitude of torque (cogging torque) acting between the rotor 2 and the stator 3 when no power is supplied is in proportion to angular inclination in the rotational direction, i.e. angular differentiation, of the interlinkage flux. In the present embodiment, since the rotor 2 is rotated at a constant angular velocity, torque is in proportion to temporal differentiation of the interlinkage flux. Accordingly, as indicated by the solid-line waveform of FIG. 3B, the temporal changes of torque are in synchronization with the temporal changes of the interlinkage flux as indicated by the solid-line waveform of FIG. 3A. Thus, the temporal changes of torque substantially sinusoidally pulsate.

In the rearward area 31, the teeth 15a and 15d completely confront the permanent magnet 8. Accordingly, a slight counterclockwise rotation of the rotor 2 in this state will not change the flux content circling the stator core 12. On the other hand, the tooth 15e only partially confronts the permanent magnet 8. The flux content in this state corresponds to substantially half of a minimum flux content or a maximum flux content. The flux content is minimized when the rotor 2 is rotated to a position where the tooth 15e is completely outside the range of the permanent magnet 8.

Therefore, in the rearward area 31, a slight counterclockwise rotation of the rotor 2 from the state shown in FIG. 2A decreases the area where the tooth 15e confronts the permanent magnet 8. Accordingly, the interlinkage flux circling the stator core 12 is decreased. Thus, the temporal changes of the interlinkage flux generated in the rearward area 31 result in a waveform as indicated by the dash-dot-dot line of FIG. 3A.

Accordingly, as indicated by the dash-dot-dot-line waveform of FIG. 3B, the temporal changes of torque are in synchronization with the temporal changes of the interlinkage flux as indicated by the dash-dot-dot-line waveform of FIG. 3A. Thus, the temporal changes of torque substantially sinusoidally pulsate.

As shown in FIG. 3B, a substantially reversed-phase relationship is established between the torque pulsation (solid line) generated in the forward area 30 and the torque pulsation (dash-dot-dot line) generated in the rearward area 31. Specifically, when the rotor 2 is rotated at a constant angular velocity by an external force with no power being supplied, the phases are offset between the forward and rearward areas 30 and 31 in the temporal changes of torque. Thus, when the torque generated in the forward area 30 is maximized, the torque generated in the rearward area 31 is minimized.

In this way, the combined torque, i.e. the torque in the forward area 30 combined with the torque in the rearward area 31, is reduced, thereby reducing cogging torque.

Further, torque ripple is also reduced owing to the full-pitch distributed winding method applied to the stator winding 14.

Second Embodiment

Figure 4A:
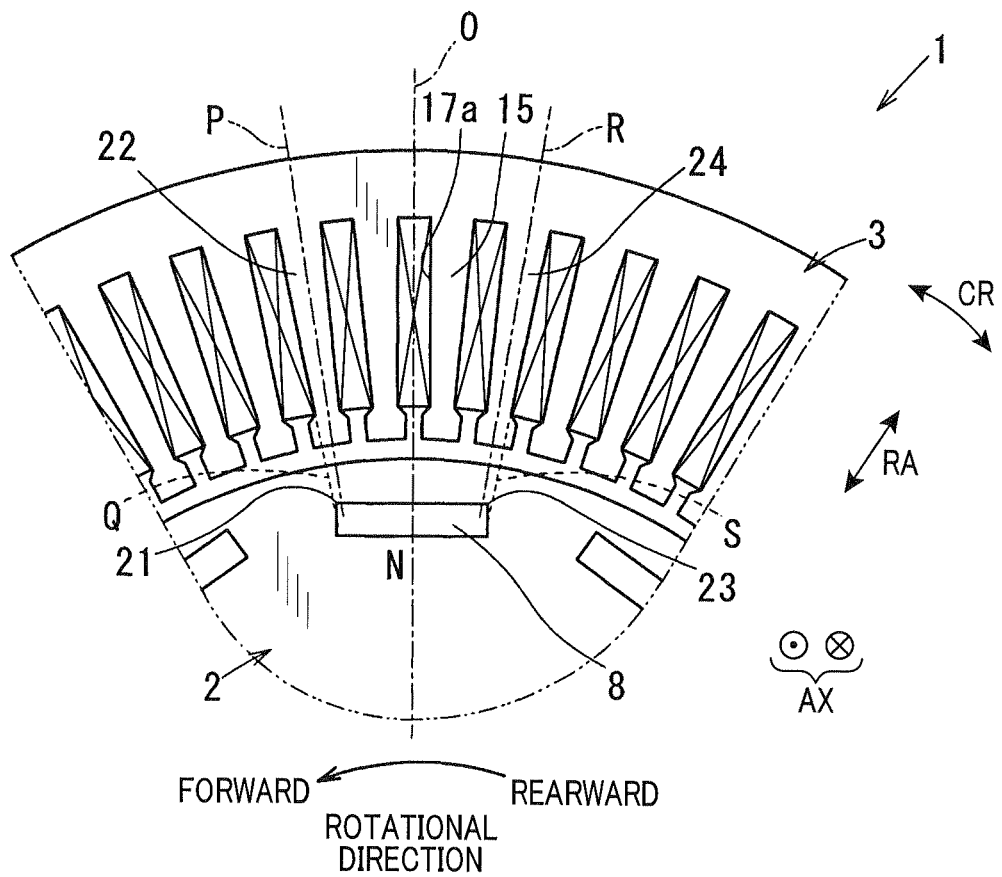
FIG. 4A is a partially enlarged view of an electric motor according to a second embodiment of the present invention.
Figure 4B:
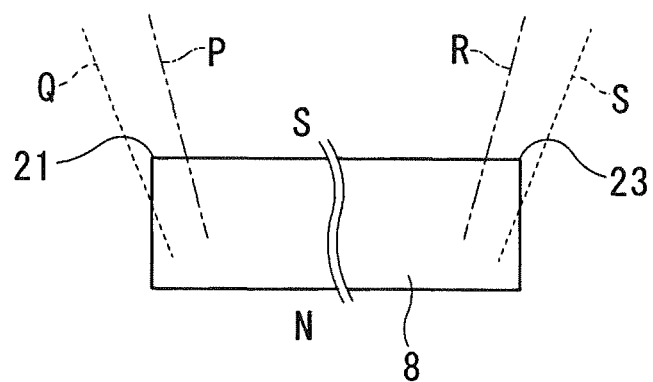
FIG. 4B is a partially enlarged view of the electric motor illustrated in FIG. 4A.

Referring now to FIGS. 4A and 4B, hereinafter is described a second embodiment of the present invention focusing on the differences from the first embodiment. In the second and the subsequent embodiments as well as in the modifications described later, the components identical with or similar to those in the first embodiment are given the same reference numerals for the sake of omitting unnecessary explanation.

FIG. 4A is a partially enlarged view of an electric motor 1 according to the second embodiment. FIG. 4B is a partially enlarged view of the electric motor 1 illustrated in FIG. 4A. In the present embodiment, the number of teeth k confronting one pole is an even number.

Specifically, the number of winding phases m is three, the number of teeth n per one pole and per one phase is two, and the number of poles p is ten. In Formula (1) set forth above, the integer j is zero and the number of teeth k confronting one pole is four.

In these conditions, the position and the size of the permanent magnet 8 are determined such that, as shown in FIG. 4B, the first corner 21 is ensured to be positioned between the center line P and the end line Q and the second corner 23 is ensured to be positioned between the center line R and the end line S. This positioning of the first and second corners 21 and 23 is established when a positional relationship between the rotor 2 and the stator 3 is such that the center line 0 of the permanent magnet 8 coincides with the center of a space between predetermined teeth 15 (i.e. the center of a predetermined slot 17a with respect to the width direction).

Thus, the advantages similar to those of the first embodiment are obtained.

Third Embodiment

Figure 5A:
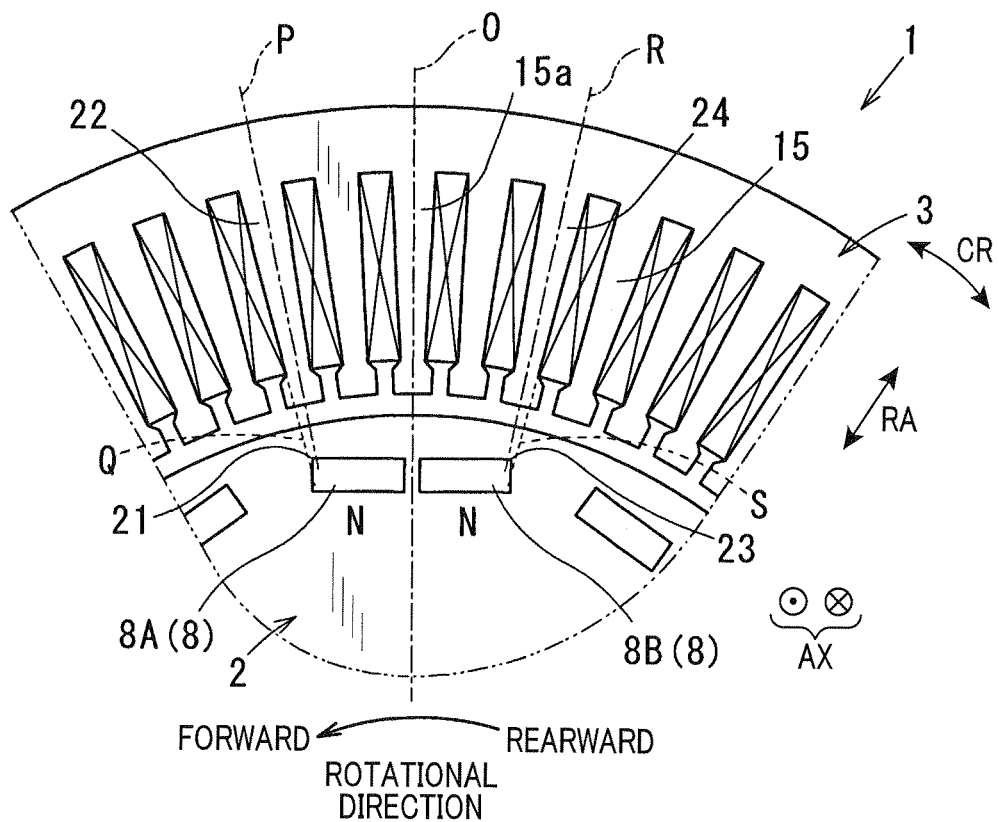
FIG. 5A is a partially enlarged view of an electric motor according to a third embodiment of the present invention.
Figure 5B:
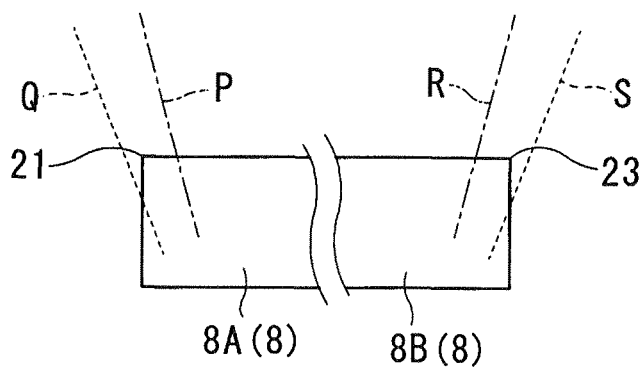
FIG. 5B is a partially enlarged view of the electric motor illustrated in FIG. 5A.

Referring to FIGS. 5A and 5B, a third embodiment of the present invention is described focusing on the differences from the first embodiment.

FIG. 5A is a partially enlarged view of an electric motor 1 according to the third embodiment. FIG. 5B is a partially enlarged view of the electric motor 1 illustrated in FIG. 5A. In the present embodiment, two permanent magnets 8 are used for one pole. The two permanent magnets 8 are linearly aligned with each other as viewed from the axial direction AX. In other words, the two permanent magnets 8 would be obtained by dividing into two the single permanent magnet 8 that has formed one pole in the first embodiment.

In this case, the center line 0 of the pole is the line connecting between the center of the space between the two permanent magnets 8 forming one pole and the rotational center of the rotor 2.

Of the two permanent magnets 8 forming one pole, the one located rotationally forward is referred to as a first magnet 8A and the other one located rotationally rearward is referred to as a second magnet 8B. In the present embodiment, the first corner 21 nearest to the stator 3 is in the first magnet 8A. Specifically, in the first magnet 8A, the first corner 21 is located rotationally forward in the direction perpendicular to the magnetization direction and located opposed to the stator 3. Also, the second corner 23 nearest to the stator 3 is in the second magnet 8B. Specifically, in the second magnet 8B, the second corner 23 is located rotationally rearward in the direction perpendicular to the magnetization direction and located opposed to the stator 3.

In these conditions, the position and the size of each of the permanent magnets 8 (8A and 8B) are determined such that, as viewed from the axial direction AX of the rotor 2 and as shown in FIG. 5B, the first corner 21 is ensured to be positioned between the center line P and the end line Q, and the second corner 23 is ensured to be positioned between the center line R and the end line S. Similar to the first embodiment, this positioning of the first and second corners 21 and 23 is established when the relationship between the rotor 2 and the stator 3 is such that, as shown in FIG. 5A, the center line 0 of the pole coincides with the center of the tooth 15a with respect to the width direction.

Fourth Embodiment

Figure 6A:
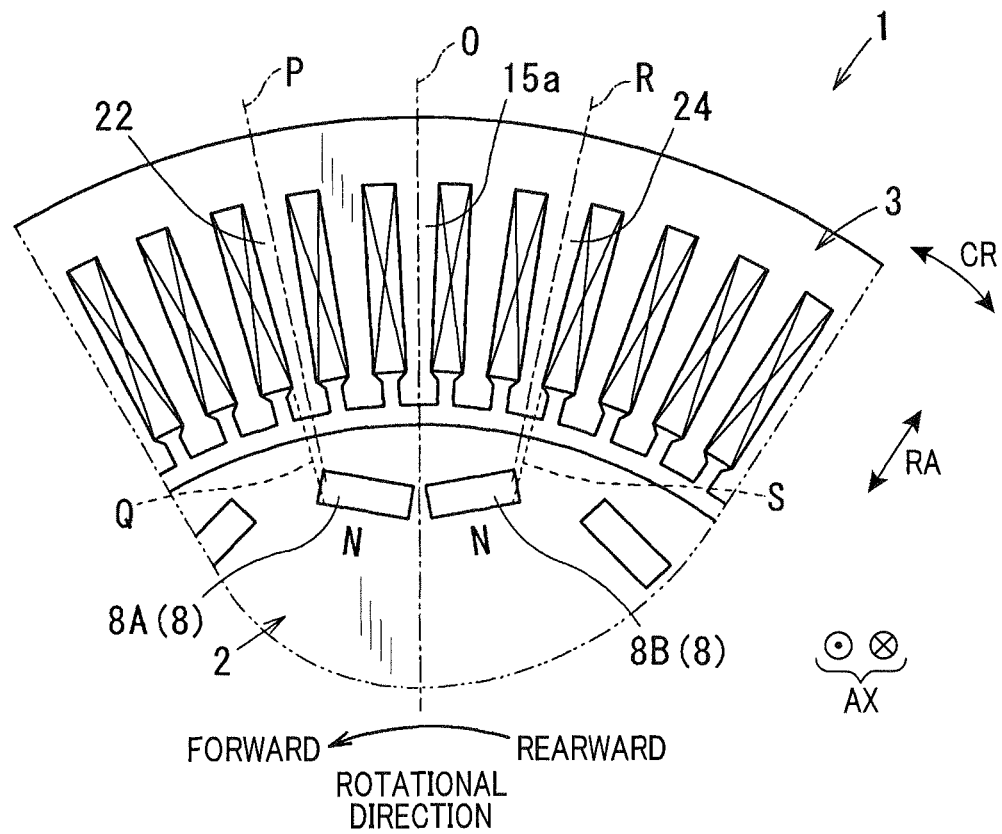
FIG. 6A is a partially enlarged view of an electric motor according to a fourth embodiment of the present invention.
Figure 6B:
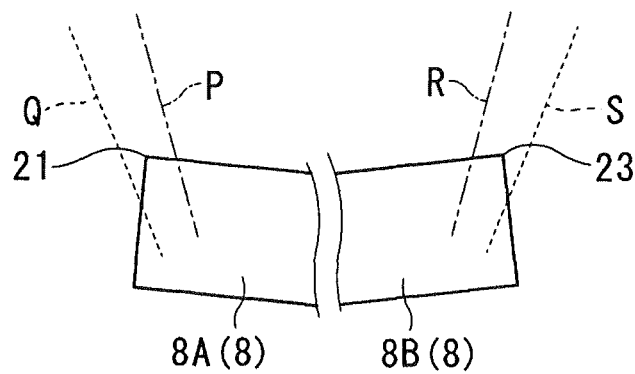
FIG. 6B is a partially enlarged view of the electric motor illustrated in FIG. 6A.

Referring to FIGS. 6A and 6B, a fourth embodiment of the present invention is described focusing on the differences from the third embodiment.

FIG. 6A is a partially enlarged view of an electric motor 1 according to the fourth embodiment. FIG. 6B is a partially enlarged view of the electric motor 1 illustrated in FIG. 6A. In the present embodiment as well, as shown in FIGS. 6A and 6B, two permanent magnets 8 (8A and 8B) are used for one pole. The two permanent magnets 8A and 8B however are arranged in a V-shaped form opening toward the outer periphery.

Fifth Embodiment

Figure 7:
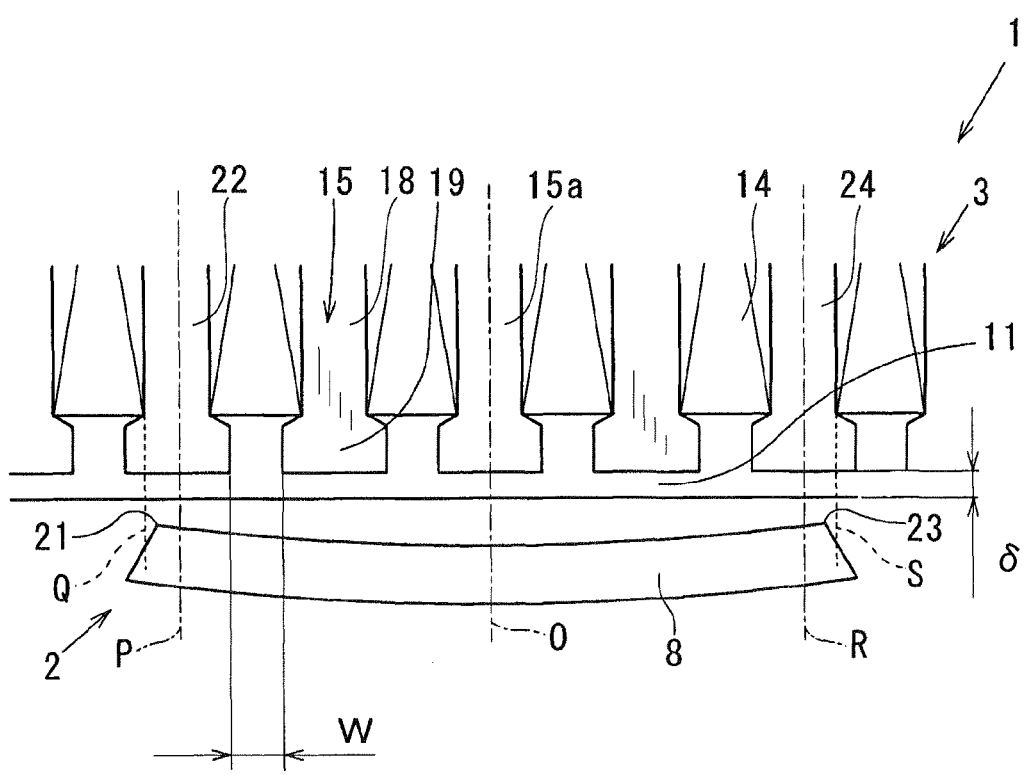
FIG. 7 is a circumferentially development view of a stator and a rotor according to a fifth embodiment of the present invention.

Referring to FIG. 7, a fifth embodiment of the present invention is described focusing on the differences from the first embodiment.

FIG. 7 is a circumferentially development view of a stator and a rotor according to the fifth embodiment. In the present embodiment, a distance W between the flange portions 19 of adjacent teeth 15 is larger than a length δ of the air gap 11.

From the view point of easily winding the stator winding 14 about the stator core 12, it is desirable that the gap between the flange portions 19 has a large distance W. However, if the flange portions 19 have a large gap therebetween, flux variation at the time when no power is supplied will be intense and thus cogging torque tends to become large. On the other hand, from the viewpoint of enhancing output of the electric motor 1, it is desirable that the air gap 11 has a small length δ. However, excessively small length δ will increase the flux density of the air gap 11 and thus cogging torque due to the flux variation will be pronounced.

In the present embodiment as well, the electric motor 1 has a pole shape similar to that in the first embodiment. In addition to that, in the electric motor 1 of the present embodiment, the distance W between the flange portions 19 of adjacent teeth 15 is made larger than the length δ of the air gap 11. Thus, three effects exerted by the electric motor 1 are balanced, the three effects being enhancement of output of the electric motor 1, ease of winding the stator winding 14 about the stator core 12 and reduction of cogging torque.

Thus, the electric motor 1 according to the present embodiment exerts an effect of minimizing cogging torque, as in the first embodiment, which is ascribed to the shape of the magnetic poles. Owing to this effect, decrease of the gap length δ to some extent or increase of the distance W between the flange portions 19 will not impair the effect of suppressing cogging torque. Thus, workability in dealing with the stator winding 14 is enhanced and the output of the electric motor 1 is also enhanced.

Sixth Embodiment

Referring to FIGS. 8A, 8B, 9A and 9B, hereinafter is described a sixth embodiment focusing on the differences from the first embodiment.

Figure 8A:
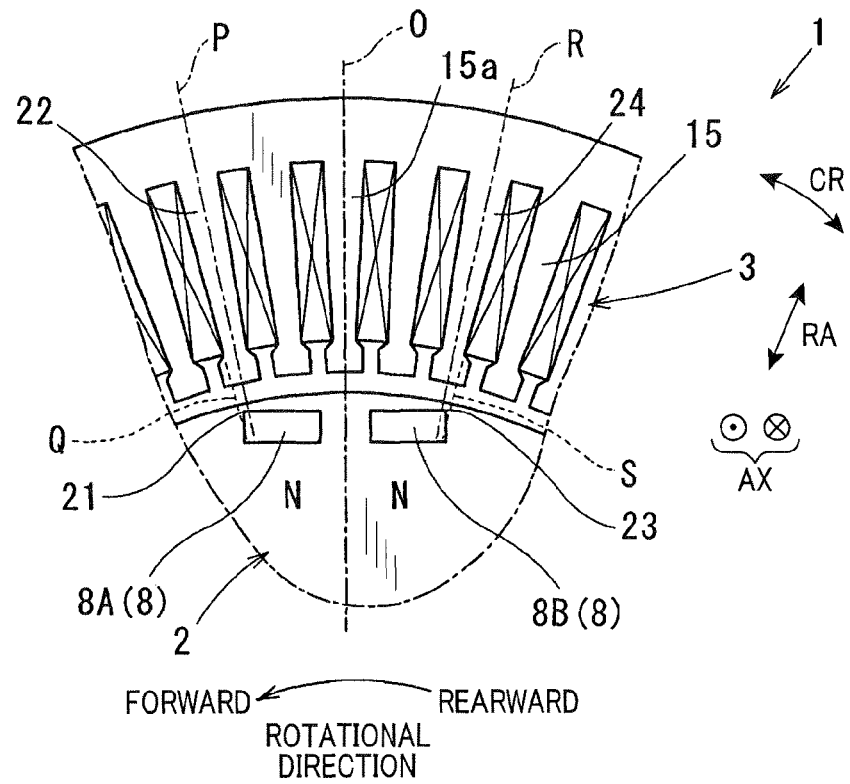
FIG. 8A is a partially enlarged view of an electric motor according to a sixth embodiment of the present invention.
Figure 8B:
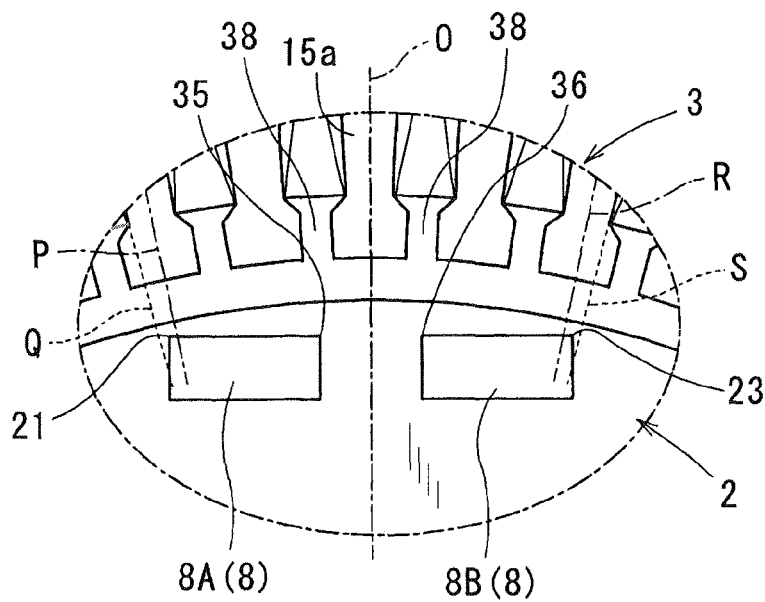
FIG. 8B is a partially enlarged view of the electric motor illustrated in FIG. 8A.

FIG. 8A is a partially enlarged view of an electric motor 1 according to the sixth embodiment. FIG. 8B is a partially enlarged view of the electric motor 1 illustrated in FIG. 8A.

Similar to the third embodiment and as shown in FIG. 8A, the electric motor 1 of the sixth embodiment is provided with magnetic poles each composed of two permanent magnets 8 (first magnet 8A and second magnet 8B). Also, similar to the first embodiment, the number of teeth k confronting one pole is an odd number.

In these conditions, the position and the size of each of the permanent magnets 8 (8A and 8B) are determined such that, as viewed from the axial direction AX of the rotor 2 and as shown in FIG. 8B, the first corner 21 is ensured to be positioned between the center line P and the end line Q, and the second corner 23 is ensured to be positioned between the center line R and the end line S. This positioning of the first and second corners 21 and 23 is established when the positional relationship between the rotor 2 and the stator 3 is such that, as shown in FIG. 8A, the center line 0 of the pole coincides with the center of the tooth 15*a* with respect to the width direction.

In the first magnet 8A, the corner opposed to the first corner 21 and positioned rotationally rearward in the direction perpendicular to the magnetization direction is referred to as a third corner 35. In the second magnet 8B, the corner opposed to the second corner 23 and positioned rotationally forward in the direction perpendicular to the magnetization direction is referred to as a fourth corner 36. In the present embodiment, each of the first and second magnets 8A and 8B has a rectangular axial cross section. Also, as viewed from the axial direction AX of the rotor 2, the direction along the shorter dimension of the magnets 8A and 8B corresponds to the magnetization direction. Thus, in the first magnet 8A, the corner opposed to the first corner 21 in the longitudinal direction is the third corner 35. In the second magnet 8B, the corner opposed to the second corner 23 in the longitudinal direction is the fourth corner 36.

The third and fourth corners 35 and 36 radially confront respective non-magnetic portions 38 which are adjacent to the tooth 15*a* on both rotationally forward and rearward sides thereof, the tooth 15*a* having a center with respect to the width direction coinciding with the center line 0. The non-magnetic portions 38 correspond to the areas between the teeth, in which areas no magnetic material is present. For example, in the present embodiment, the non-magnetic portions 38 correspond to the gaps between the teeth.

Figure 9A:
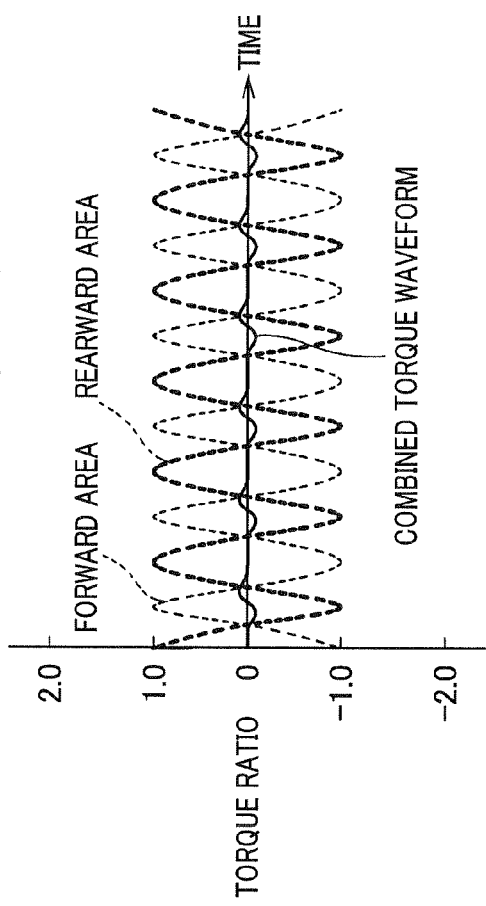
FIG. 9A is a waveform diagram illustrating temporal changes of torque in rotationally forward and rearward areas when no electric power is supplied, and temporal changes of combined torque, i.e. the torque in the forward area combined with the torque in the rearward area, according to the sixth embodiment.
Figure 9B:
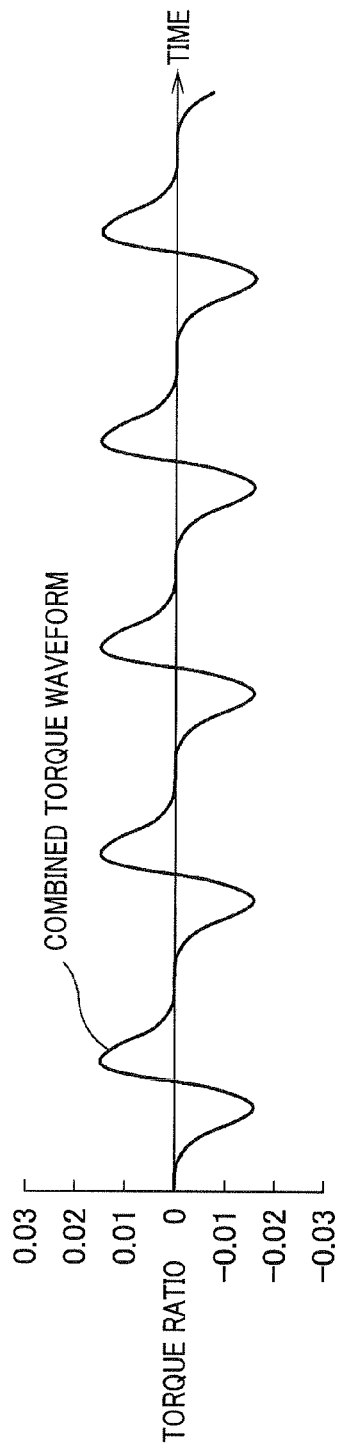
FIG. 9B is an enlarged view of the combined torque illustrated in FIG. 9A.

When one pole is composed of two permanent magnets 8 (8A and 8B), harmonic components are reduced from the combined torque, i.e. the torque generated in the forward area 31 combined with the torque generated in the rearward area 31. Referring to FIGS. 9A and 9B, advantages of the sixth embodiment are described.

FIG. 9A is a waveform diagram illustrating temporal changes of torque in rotationally forward and rearward areas when no electric power is supplied, and temporal changes of combined torque. FIG. 9B is an enlarged view of the combined torque illustrated in FIG. 9A.

It is true that, in a configuration where the third and fourth corners 35 and 36 do not confront the non-magnetic portions 38 (e.g., third embodiment), the combined torque is reduced and thus cogging torque is also reduced. However, in such a configuration, as shown in FIGS. 9A and 9B, harmonic components may be caused in the combined torque. In FIGS. 9A and 9B, the vertical axis indicates torque ratio in the case where a maximum value of torque is 1.

However, as in the present embodiment where the number of teeth k is an odd number, the harmonic components are reduced from the combined torque, on condition that the third and fourth corners 35 and 36 radially confront the respective non-magnetic portions 38 which are adjacent to the tooth 15*a* on both rotationally forward and rearward sides thereof, the tooth 15*a* having a center with respect to the width direction coinciding with the center line 0. Accordingly, cogging torque is more effectively reduced.

Seventh Embodiment

Figure 10:
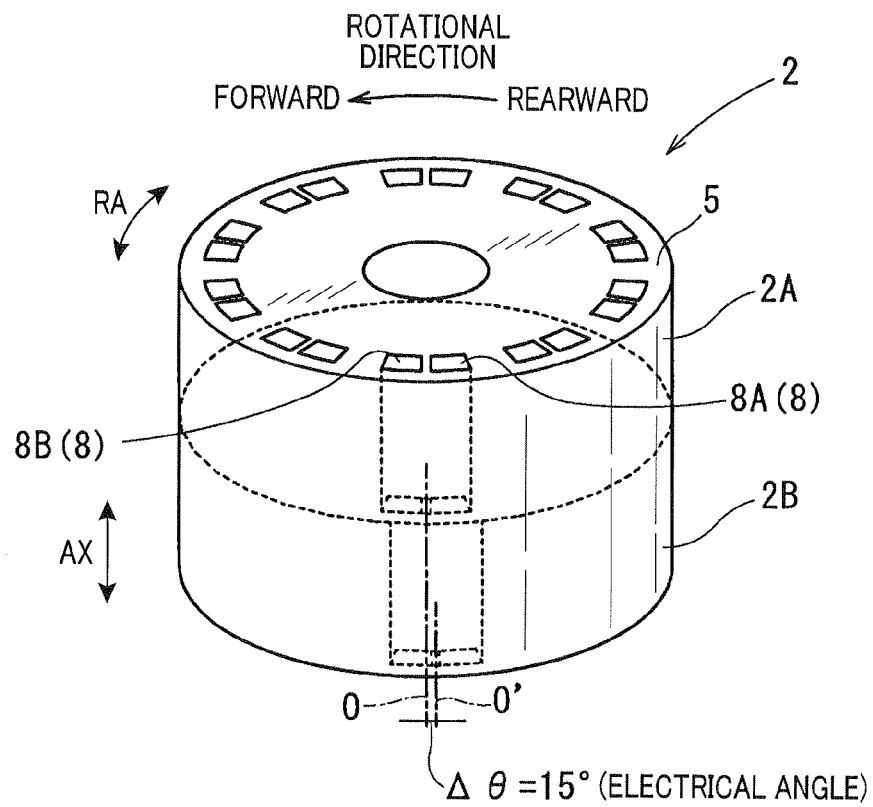
FIG. 10 is a perspective view illustrating a rotor having a stepped skew according to a seventh embodiment of the present invention.
Figure 11:
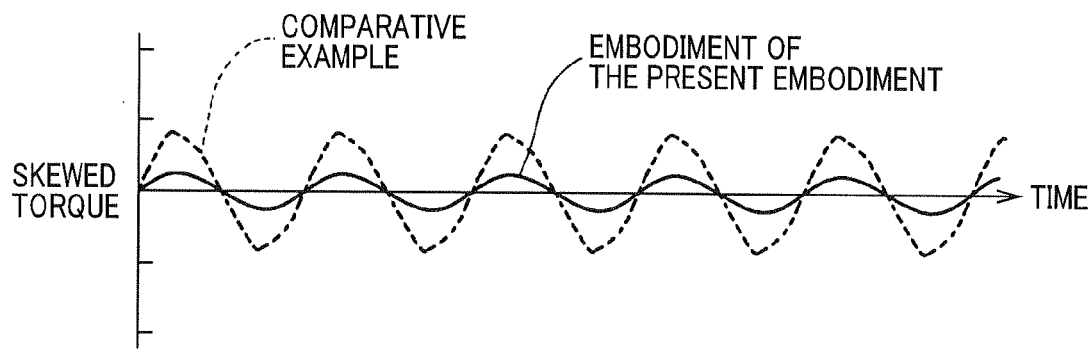
FIG. 11 is a waveform diagram illustrating combined torque, i.e. the torque generated in one of two rotor blocks combined with the torque generated in the other of the two rotor blocks in the stepped skew, according to the seventh embodiment and according to a comparative example.

Referring to FIGS. 10 and 11, an electric motor according to a seventh embodiment of the present invention is described focusing on the differences from the sixth embodiment.

FIG. 10 is a perspective view illustrating a rotor 2 of an electric motor according to the seventh embodiment. As shown in FIG. 10, the rotor 2 is configured by coaxially stacking two rotor blocks 2A and 2B in the axial direction AX. Each of the rotor blocks 2A and 2B is embedded with the permanent magnets 8 (8A and 8B). Also, the number of teeth k per one pole is an odd number.

In these conditions, the position and the size of each of the permanent magnets 8 (8A and 8B) are determined such that, as viewed from the axial direction AX of the rotor 2, the first corner 21 is ensured to be positioned between the center line P and the end line Q, and the second corner 23 is ensured to be positioned between the center line R and the end line S. This positioning of the first and second corners 21 and 23 is established when the positional relationship between the rotor block 2A and the stator 3 is such that, similar to the one shown in FIGS. 8A and 8B, the center line 0 of the magnetic pole coincides with the center of the tooth 15*a* with respect to the width direction.

In the rotor block 2A, the permanent magnets 8A and 8B are arranged so that the third and fourth corners 35 and 36 radially confront the respective non-magnetic portions 38 which are adjacent to the tooth 15*a* on both rotationally forward and rearward sides thereof, the tooth 15*a* having a center with respect to the width direction coinciding with the center line 0.

The rotor block 2B includes the permanent magnets 8A and 8B whose sizes and embedding pitch are the same as those of the permanent magnets 8A and 8B in the rotor block 2A.

As shown in FIG. 10, the rotor blocks 2A and 2B are stacked so that the magnetic poles of the rotor block 2B are each circumferentially offset from the magnetic poles of the rotor block 2A. In other words, the rotor 2 is provided with a stepped skew.

Specifically, each magnetic pole of the rotor block 2B has a center line 0' which is offset rotationally forward from the center line 0 of each magnetic pole of rotor block 2A by an electrical angle of 15°.

According to the present embodiment, the combined torque caused in the two rotor blocks 2A and 2B is reduced. Further, according to the present embodiment, harmonic components are more effectively reduced and thus a smoother waveform is provided. Referring to FIG. 11, advantages of the present embodiment are described.

FIG. 11 is a waveform diagram illustrating combined torque, i.e. the torque generated in the rotor block 2A combined with the torque generated in the rotor block 2B, in a stepped skew, according to the present embodiment and according to a comparative example.

In the rotor block 2A, if the third and fourth corners 35 and 36 do not confront the respective non-magnetic portions 38 (the comparative example), harmonic components remain in the combined torque resulting from the stepped skew, i.e. the torque generated in the rotor block 2A combined with the torque generated in the rotor block 2B (hereinafter this combined torque is referred to as skewed torque). Thus, a stepped skew allows harmonic components to remain in the skewed torque, causing distortion in the waveform (see the broken-line waveform of FIG. 11).

In the present embodiment, however, the third and fourth corners 35 and 36 are ensured to confront the respective non-magnetic portions 38. Accordingly, harmonic components are reduced from the combined torque, i.e. the torque in the forward area 30 combined with the torque in the rearward area 31 in the block 2A (refer to the advantages described in the sixth embodiment). Thus, as shown by the solid-line waveform of FIG. 11, harmonic components are also reduced from the skewed torque and the skewed torque per se is reduced. In this way, cogging torque is more effectively reduced.

Eighth Embodiment

Figure 12A:
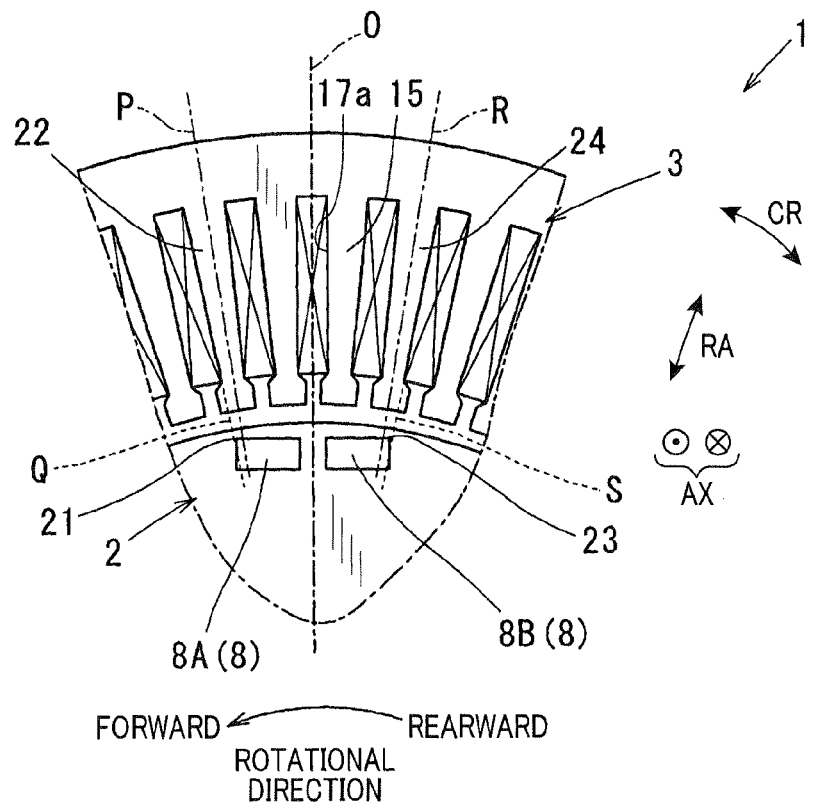
FIG. 12A is a partially enlarged view of an electric motor according to an eighth embodiment of the present invention.
Figure 12B:
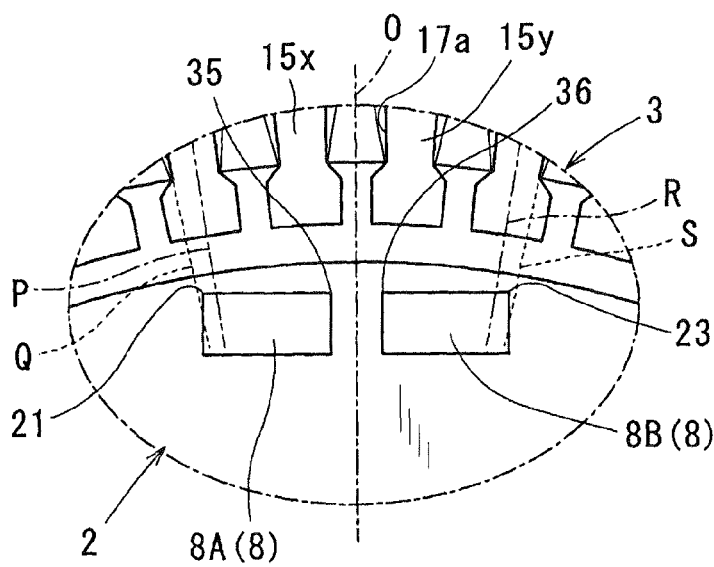
FIG. 12B is a partially enlarged view of the electric motor illustrated in FIG. 12A.

Referring to FIGS. 12A and 12B, an eighth embodiment of the present invention is described focusing on the differences from the sixth embodiment.

FIG. 12A is a partially enlarged view of an electric motor 1 according to the eighth embodiment. FIG. 12B is a partially enlarged view of the electric motor 1 illustrated in FIG. 12A. In the present embodiment, the number of teeth k per one pole is an even number.

In these conditions, the position and the size of each of the permanent magnets 8 (8A and 8B) are determined such that, as shown in FIG. 12B, the first corner 21 is positioned between the center line P and the end line Q, and the second corner 23 is positioned between the center line R and the end line S. This positioning of the first and second corners 21 and 23 is established when the positional relationship between the rotor 2 and the stator 3 is such that, as shown in FIG. 12A, the center line 0 of the magnetic pole coincides with the center of a space between predetermined teeth 15 (i.e. the center of a predetermined slot 17a with respect to the width direction).

Further, the permanent magnets 8A and 8B are arranged so that the third and fourth corners 35 and 36 radially confront respective teeth 15x and 15y which are adjacent to the slot 17a on both rotationally forward and rearward sides thereof, the slot 17a having a center with respect to the width direction coinciding with the center line 0.

Thus, advantages similar to those of the sixth embodiment are obtained.

[Modifications]

The present invention is not limited to the embodiments described above but may be variously modified.

For example, the electric motor 1 described in each of the above embodiments has been an inner-rotor type motor having the rotor 2 inside. Alternatively, the present invention may be applied to an outer-rotor type electric motor.

In the embodiments described above, the stator winding 14 has been a three-phase coil. However, the number of phases m of the winding is not limited to three.

In the embodiments described above, each permanent magnet has been a plate having a rectangular axial cross section. Alternative to this, the axial cross section may have a shape of an arc, a trapezoid or the like. Alternatively, the corners of each permanent magnet 8 may be chamfered.

Further, a stepped skew may be applied to the rotor 2 of the first embodiment, in which one permanent magnet 8 configures one magnetic pole.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An electric motor, comprising:
 a rotor having magnetic poles composed of permanent magnets; and
 a stator comprising a stator core arranged with an air gap between the rotor and stator core, the stator being formed to extend in a radial direction and a circumferential direction, the stator core having a back yoke, teeth extended radially from the back yoke and arrayed at equal pitches in the circumferential direction, and slots each formed between two of the teeth and arrayed at equal pitches in the circumferential direction, the stator windings being wound through the slots,
 wherein each of the teeth comprises a radially extending pillar portion,
 the number of the teeth per magnetic pole, k, is set to $$k = m^* n - (n-j),$$

where m denotes the number of phases of the stator windings, n denotes the number of teeth per pole and per phase, n being a positive number, j denotes a number which is $0 \leq j < n$,
 when the number k is odd and a center line passing each of the poles agrees with a center of a circumferential width of one of the teeth in the circumferential direction, the pole has a first corner which is the closest to the stator and positioned before the center line in a rotational direction of the rotor, the teeth includes a tooth which is the closest to the first corner and which is defined as a first tooth, the pole has a second corner which is the closest to the stator and positioned after the center line in the rotational direction, the teeth include a tooth which is the closest to the second corner and which is defined as a second tooth,
 the first corner is set to be located between a line passing through a center of a circumferential width of the first tooth and a first line passing through a front edge of the pillar portion of the first tooth in the rotation direction,
 the second corner is set to be located between a line passing through a center of a circumferential width of the second tooth and a second line passing through a rear edge of the pillar portion of the second tooth in the rotation direction,
 a first magnet has a third corner located to be opposed to the first corner in a direction perpendicular to a magnetization direction of the first magnet and positioned before the center line in the rotational direction,
 the first corner is a corner of the first magnet closest to the stator before the center line.
 a second magnet has a forth corner located to be opposed to the second corner in a direction perpendicular to a magnetization direction of the second magnet and positioned after the center line in the rotational direction,
 the second corner is a corner of the second magnet closest to the stator after the center line, and
 the third and fourth corners are opposed, in the radial direction, to non-magnetic portions produced in two of the slots, which two slots are located, in the circumferential direction, before and after the tooth through which the center line passes.

2. The electric motor of claim 1, wherein
the rotor is composed of two rotor blocks with the poles, the two rotor blocks being stacked on one the other in the axial direction, and
one of the two blocks is skewed from the other of the two blocks in the circumferential direction.

3. The electric motor of claim 1, wherein each of the teeth has a flange portion formed atop the pillar portion, and
two pillar portions mutually adjacent to each other are separated, in the circumferential direction, by a distance larger than an amount of the air gap formed between the stator and the rotor.

4. The electric motor of claim 1, wherein the stator windings are full-pitch windings.

5. The electric motor according to claim 1, wherein:
the electric motor is configured such that a slight counter-clockwise rotation of the rotor increases an interlinkage flux circling the stator core via the first tooth, and decreases an interlinkage flux circling the stator core via the second tooth.

\* \* \* \* \*